United States Patent
McGregor et al.

(10) Patent No.: US 6,403,890 B1
(45) Date of Patent: *Jun. 11, 2002

(54) MAGNET WIRE INSULATION FOR INVERTER DUTY MOTORS

(75) Inventors: Charles W. McGregor; Joseph J. Harber; James J. Connell; Ronald J. Beeckman, all of Fort Wayne, IN (US)

(73) Assignee: Essex Group, Inc., Fort Wayne, IN (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/618,330

(22) Filed: Jul. 18, 2000

Related U.S. Application Data

(63) Continuation-in-part of application No. 08/880,987, filed on Jun. 23, 1997, now Pat. No. 6,100,474.

(51) Int. Cl.[7] .................................................. H01B 7/00
(52) U.S. Cl. .................................................. 174/120 R
(58) Field of Search ...................... 174/110 R, 110 SR, 174/120 R, 120 SR, 127; 428/372, 375, 383, 384, 389

(56) References Cited

U.S. PATENT DOCUMENTS

| | | | |
|---|---|---|---|
| 3,671,480 A | 6/1972 | Wada et al. | 260/29.1 SB |
| 4,476,192 A | 10/1984 | Imai et al. | 428/391 |
| 4,493,873 A | 1/1985 | Keane et al. | 428/372 |
| 4,503,124 A | 3/1985 | Keane et al. | 428/372 |
| 4,521,549 A | 6/1985 | Penneck | 523/173 |
| 4,537,804 A | 8/1985 | Keane et al. | 427/118 |
| 4,546,041 A | 10/1985 | Keane et al. | 428/372 |
| 4,760,296 A | 7/1988 | Johnston et al. | 310/45 |
| 4,806,806 A | 2/1989 | Hjortsberg et al. | 310/45 |
| 4,935,302 A | 6/1990 | Hjortsberg et al. | 428/383 |
| 4,980,086 A | 12/1990 | Hiraiwa et al. | 252/511 |
| 5,061,554 A | 10/1991 | Hjortsberg et al. | 428/220 |
| 5,654,095 A | 8/1997 | Yin et al. | 428/372 |
| 5,668,205 A | 9/1997 | Yoshida et al. | 524/268 |
| 5,861,578 A * | 1/1999 | Hake et al. | 174/120 SR |
| 6,060,162 A | 5/2000 | Yin et al. | 428/372 |
| 6,180,888 B1 * | 1/2001 | Yin et al. | 174/110 SR |

* cited by examiner

*Primary Examiner*—Chau N. Nguyen
(74) *Attorney, Agent, or Firm*—Rader, Fishman & Grauer PLLC

(57) ABSTRACT

A magnet wire insulation designed to withstand voltage wave shapes present in inverter driven motors for a sustained period of time is disclosed. A large surface area inorganic oxide, e.g., fumed silica, may be added into the magnet wire insulation for providing improved resistance to insulation degradation. Alternatively, a mixture of the large surface area inorganic oxide with a low resistivity oxide, e.g., chromium oxide, provides a greater improvement in resistance to insulation degradation. The present invention is particularly useful for extending the life of windings in a motor that is subjected to high voltage, steep wave shapes such as those found in inverter driven motors.

14 Claims, 1 Drawing Sheet

MAGNET WIRE INSULATION FOR INVERTER DUTY MOTORS

CROSS-REFERENCE TO RELATED APPLICATION

This application is a continuation-in-part of Ser. No. 08/880,987, filed Jun. 23, 1997, now U.S. Pat. No. 6,100,474.

BACKGROUND OF THE INVENTION

The present invention relates to magnet wire insulation designed to withstand voltages present in inverter driven motors for a sustained period of time. More specifically, the present invention relates to magnet wire insulation that is intended to improve the life of motor windings when used in conjunction with an inverter drive, e.g., pulse-width modulated variable frequency drive.

Inverter drives and inverter driven motors have received increased attention because of continuing needs for greater energy efficiency. It has been estimated that three-phase induction motors consume 60–70% of the electrical energy used in the United States. These motors obviously waste substantial energy when run at full speed when conditions do not require it.

An adjustable speed drive (ASD) allows a motor to operate at variable speed by providing variable frequency to the motor. Electronic ASDs convert the incoming line voltage at 60 Hz to direct current (DC). The inverter then generates variable frequencies as input to the motor. These variable frequencies, however, can exhibit steep wave shapes that have been linked to premature motor winding failures in 440+voltage motors. The mode of failure in these motor windings has been linked to the degradation of the wire insulation caused by the high voltage and higher frequency wave shapes.

Various attempts have been made to reduce premature failures as a result of degradation of the wire insulation. These attempts have included minimizing damage to the wire and insulation during handling and manufacture of the motors, and using shorter lead lengths from the inverter to the motor where appropriate. Further, a reactor coil or a filter between the inverter drive and the motor can extend the life of the windings by reducing the voltage spikes and high frequencies generated by the inverter drive/motor combination. However, such coils are expensive and add to the overall cost of the system. Increasing the amount of insulation from standard heavy build magnet wire can improve the life of the windings in the motor, but this option is both expensive and decreases the amount of space for the copper in the motor, thereby producing a less efficient motor. Another option includes increasing the amount of varnish in the motor windings, however, this strategy is ineffective if the windings are not completely covered.

Therefore, there is a need for a magnet wire insulation that is designed to withstand voltages which are present in inverter driven motors for longer periods of time as compared to the present constructions.

SUMMARY OF THE INVENTION

The disclosed invention improves the resistance to voltages present in the windings of inverter driven motors without many of the drawbacks associated with prior strategies for reducing premature failures. The invention includes adding high surface area silica or a mixture of silica and chromium oxide to the magnet wire insulation. Thus, the disclosed insulation comprises one or more layers of a cured, wire enamel type polymer with high surface area silica or a mixture of silica and chromium oxide dispersed in one or more of the polymeric layers.

The invention extends the life of the windings in a motor used in an inverter drive application. In practicing the invention, a copper conductor is overcoated with a polyester base coat and a polyamide-imide topcoat. High surface area silica or a blend of silica and chromium oxide is added to the polyamide-imide topcoat. The invention, however, is not limited to two-layer enamels used in magnet wires.

While the prior art shows the addition of inorganic oxides or organo-metallic compounds to magnet wire enamels, the life of motor windings used in inverter drives and inverter drive motors is improved when high surface area, i.e., fumed silica, is dispersed either alone or with chromium oxide in the insulation. The present invention provides an inorganic oxide, namely fumed silica, which has a large surface area for permitting more energy dissipation in the insulation. This improves the life of motor windings that are subjected to the high voltages present in inverter driven motors. Moreover, a mixture of fumed silica and a low resistivity oxide, namely chromium oxide, provides additional improvement to the life of motor windings. Though not bound by any particularly theory, it is believed that the larger surface area provided by fumed silica will permit more energy dissipation in the insulation and the low resistivity oxide will spread the electrical charge over the surface of the insulation. It has been discovered that the mixture of fumed silica and chromium oxide provides a better result than using either the fumed silica or chromium oxide alone. The addition of a third, unfilled topcoat does not significantly affect the life of motor windings, but helps decrease tooling wear associated with the abrasive inorganic oxide particles.

It was intended that one of the inorganic oxide additives have a large surface area for permitting more energy to dissipate in the insulation. Silica is believed to be the only inorganic oxide commercially available in grades having different particulate surface areas. Available specific surface areas for silica range from approximately 90 to 550 m$^2$/g. Since it was found that resistance to insulation failure in an inverter drive motor improves with increasing silica surface area, the preferred silica grade for the present invention has a specific surface area between about 380 and 550 m$^2$/g. The preferred range of silica in the insulation is between about 10 and 50% based on weight. Substantial improvement is not observed at silica levels below about 10%, and insulation flexibility is lost at silica levels greater than about 50%. Further, to ensure a smooth, continuous surface, the silica is milled to break up any agglomerates. The silica may be milled directly into the wire enamel in the presence of solvent, or the silica can be milled in solvent and then added to the enamel. In either case, milling breaks up the agglomerates and the solvent keeps the particles from re-agglomerating. Once the silica has been dispersed in the polymer, the polymer is applied to a conductor in a conventional fashion. For magnet wire, the uncured insulation is applied by using multi-pass coating and wiping dies followed by curing at elevated temperature.

As set forth previously, even better results in extending the life of the windings in a motor is achieved by adding a mixture of inorganic oxides, namely silica and chromium oxide, into the magnet wire insulation. A dispersion of silica and chromium oxide is added to a polyamide-imide wire enamel whereby the concentration of the total oxide is in the range of about 5–50% based on the total polymer weight. The resulting magnet wire enamels may then be coated on a wire using conventional techniques.

DETAILED DESCRIPTION OF THE PREFERRED EMBODIMENTS

The present invention includes adding an inorganic oxide having a large surface area to one or more layers of a magnet wire insulation. Alternatively, the large surface area inorganic oxide is mixed with a low resistivity inorganic oxide, and the mixture is added to one or more layers of the magnet wire insulation.

Figure 1:
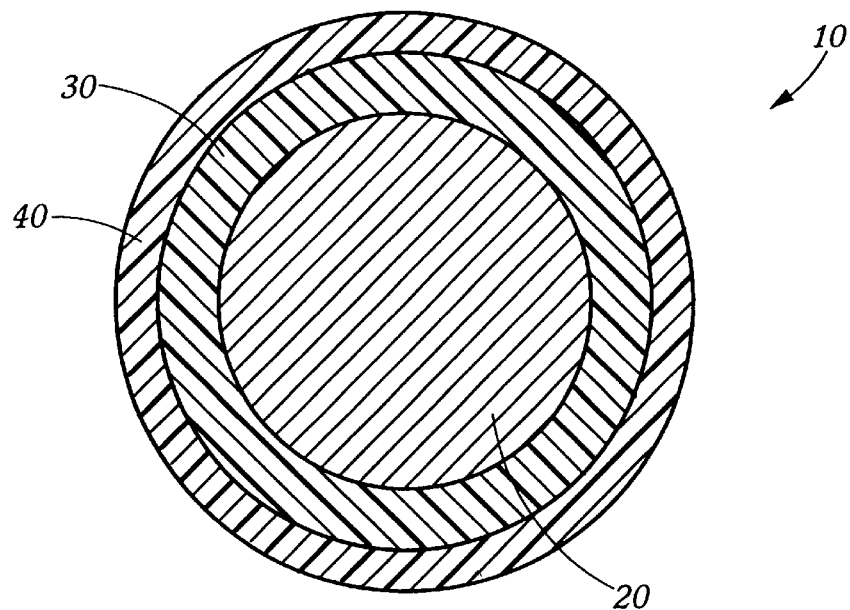
FIG. 1 shows a cross-sectional view of a conductor insulated with a two-layer insulation made in accordance with the present invention.

Referring now to the drawings, FIG. 1 shows a cross-sectional end-view of magnet wire 10, which includes a metallic conductor 20 coated with a polymeric base coat 30 and topcoat 40. One or both of the insulation layers 30, 40 include either a large surface area inorganic oxide (e.g., silica) or a mixture of a large surface area inorganic oxide and a low resistivity inorganic oxide (e.g., chromium oxide). Useful base coat 30 and topcoat 40 polymers include polyester and polyamide-imide, respectively. While NEMA 1000, MW35-C type magnet wire enamels typically include a polyamide-imide topcoat and polyester base coat, the present invention may use other thermosetting or thermoplastic polymers in the insulation layers.

Figure 2:
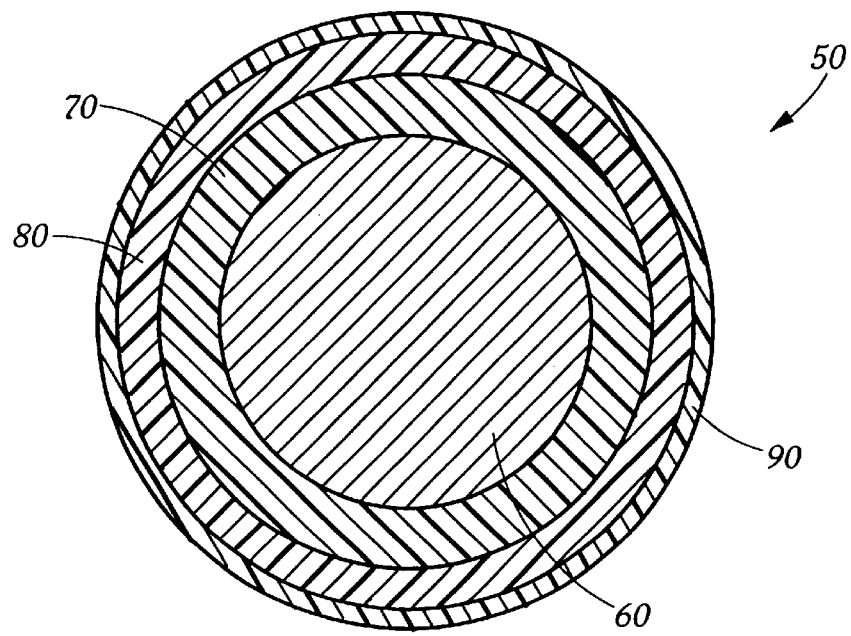
FIG. 2 shows a cross-sectional view of a conductor insulated with a three-layer insulation made in accordance with the present invention.

FIG. 2 shows a cross-sectional end-view of a three-coat magnet wire 50. The embodiment shown in FIG. 2 includes a metallic conductor 60 surrounded by a polymeric base coat 70, a first polymeric layer 80 disposed on the base coat 70, and a second polymeric layer 90 disposed on the first polymeric layer 80. As in the embodiment shown in FIG. 1, useful polymers for the base coat 70 and for the first 80 and second 90 polymeric layers, include polyester and polyamide-imide, respectively. The base coat 70 and/or the first polymeric layer 80 include either a large surface area inorganic oxide (e.g., silica) or a mixture of a large surface area inorganic oxide and a low resistivity inorganic oxide (e.g., chromium oxide). The outermost or second polymeric layer 90 is relatively thin and does not contain an inorganic oxide. The addition of the unfilled polymeric layer 90 helps decrease tooling wear associated with the abrasive inorganic oxide particles.

The present invention will be described initially with respect to the addition of only a large surface area inorganic oxide, namely fumed silica, to the magnet wire insulation. A large surface area inorganic oxide was selected because it is believed that the larger surface area permits more energy to penetrate through the insulation thereby reducing the degradation of the insulation caused by high voltage and high frequency wave shapes in inverter drive motors. Silica is commercially available in grades having specific surface areas ranging from approximately 90 to 550 $m^2/g$. For example, AEROSIL 90, available from Degussa, has a specific surface area of 90 $m^2/g$, and EH-5, available from Cabot, has a specific surface area of 380 $m^2/g$. It has been discovered that the resistance to the voltage wave shapes present in the windings of inverter driven motors is improved with increasing silica surface area. Thus, silica grades having specific surface areas between 380 and 550 $m^2/g$ are preferred.

Silica used in the present invention has a nominal particle size less than one micron. Further, it is preferable to use fumed silica (manufacture by gas phase hydrolysis of the corresponding halide). Moreover, the preferred range of silica in a single layer of insulation is between about 10 and 50% based on weight. Substantial improvement in the life of the windings of an inverter driven motor is not observed at silica levels below about 10% and insulation flexibility is generally unacceptable at silica levels greater than about 50%. The silica may be added to one, some or all of the insulation layers.

The fumed silica is added to the polymer insulation by milling to ensure a smooth, continuous enamel surface. In one method, the silica is milled directly into the wire enamel in the presence of a solvent. Alternatively, the silica is milled in solvent and then added to the enamel. In either case, milling breaks up the agglomerates and the solvent keeps the particles from re-agglomerating. Finally, it is preferred that the silica be milled to a Hegman grind of "seven" or finer, which corresponds to an approximately particle size of about 12.7 microns.

Once the silica has been dispersed in the polymer, the polymer is applied to a conductor in a conventional fashion. For magnet wire, the uncured insulation is applied using multi-pass coating and wiping dies followed by curing at an elevated temperature. For a polyester base coat and polyamide-imide topcoat magnet wire, the curing temperature may range between about 230° C. and 600° C., depending on the wire speed. Wire speeds may vary from approximately 2 to 1600 ft/min or more, depending on the type of conductor that is coated. The buildup of the enamel on the wire can range between about 0.2 and 10 mils.

Another embodiment of the present invention includes adding a mixture of a large surface area inorganic oxide and a low resistivity inorganic oxide, namely fumed silica and chromium oxide ($Cr_2O_3$), to the magnet wire insulation. Surprisingly, adding relatively small amounts of fumed silica and chromium oxide results in better life of inverter duty motors than adding comparable amounts of silica alone. Mixtures of silica and chromium oxide are dispersed in one or more of the polymer layers in a manner similar to the method described above for dispersing silica alone. The weight ratio of silica to chromium oxide can vary among magnet wire applications, although a one-to-one weight ratio of silica to chromium oxide appears to work well. The preferred range of total oxide (silica and chromium oxide) in a single layer of insulation is between about 5% and 50% based on weight. Substantial improvement in the life of windings of inverter duty motors is not observed at total oxide levels much below about 5% by weight and insulation flexibility is generally unacceptable at total oxide levels greater than about 50% based on weight. The mixture of silica and chromium oxide may be added to one, some or all of the insulation layers, and the oxide-filled wire enamels are applied using conventional coating techniques.

EXAMPLES

The following examples are intended as illustrative and non-limiting, and represent specific embodiments of the present invention.

A first example shows the improvement in the resistance to voltages present in inverter driven motor windings. Magnet wires having a polyester base coat and a polyamide-imide topcoat were prepared. Two grades of fumed silica were used: "low" surface area silica, having a specific surface area of 90 $m^2/g$ and "high" surface area silica having a specific surface area of 380 $m^2/g$. In this example, fumed silica was added to the polyamide-imide enamel only and comprised about 15% of the polyamide-imide layer by weight.

The wire enamels were applied to an 18 AWG copper wire using multi-pass coating and wiping dies. Table I sets forth the influence of the fumed silica and specific surface area on the resistance of the magnet wire insulation to degradation. References in Table I to "single," "heavy," "triple," and "quad" correspond to the nominal insulation thickness of 1.7, 3.0, 4.3 and 6.4 mils, respectively. In all cases, the polyester base coat enamel thickness was maintained at about 1.8 mils.

Various magnet wires were tested at Essex's Magnet Wire Testing Laboratory using an inverter drive and a three-phase motor. Typical dielectric twisted pairs were made from the wire and placed in an oven at 200° C. High voltage, high frequency wave forms from a 460-volt ac inverter drive were then sent through each of the twisted pairs. The twisted pairs, which each had about the same length, were monitored until a short circuit occurred and the time to short circuit was then recorded. The longer the time to short circuit (failure), the better the resistance to insulation degradation. The time to failure for the various magnet wire enamel formulations and thicknesses are set forth in Table I.

TABLE I

| Insulation Thickness (Build) | Low Surface Area Silica | High Surface Area Silica | Time to Failure, Hours |
|---|---|---|---|
| Single | — | — | 0.02–0.4 |
| Heavy | — | — | 7 |
| Triple | — | — | 19 |
| Quad | — | — | 250 |
| Heavy | — | X | 309 |
| Heavy | X | — | 52 |

As expected, increasing the wire insulation thickness improved the resistance to insulation degradation. For example, quadrupling the enamel thickness resulted in an increase in time to failure of 600–1000 times. More significant, however, was the fact that a greater improvement in degradation resistance is achieved by adding a "high" surface area fumed silica to the "heavy" insulation. Indeed, the time to failure for the "heavy" enamel thickness improved about 44 times (309 hours versus 7 hours). Moreover, magnet wire with an enamel containing "high" surface area silica showed nearly a six-fold improvement in time to failure when compared to magnet wire insulated with an enamel containing a "low" surface area silica (309 hours versus 52 hours).

The next example shows the improvement in degradation resistance when a mixture of silica and chromium oxide was added into the insulation. A dispersion was prepared using a one-to-one weight ratio of silica to chromium oxide ($Cr_2O_3$). The dispersion was then added to a polyamide-imide (AI) wire enamel where the concentration of the total oxide was 15% based on the total AI weight. Dispersions were also made in which silica and chromium oxide ($Cr_2O_3$) were used alone, and these dispersions were also incorporated into a polyamide-imide (AI) enamel at the same oxide level. The resulting magnet wire enamels were then coated on 18 AWG wire in a test oven to comply with NEMA 1000 MW35-C specifications. The final insulated wire build consisted of approximately 60% polyester base coat and 40% polyamide-imide topcoat or 80% polyester and 20% polyamide-imide. Typical dielectric twisted pairs (five each) were made from the wire and tested at 150° C. Wave shapes from the 460-volt ac inverter drive/three-phase motor set up were sent through each of the twisted pairs, which were monitored until they shorted out, signifying a failure. The times were recorded from the beginning of the test to each short, and the hours to failure were recorded. An average for each wire construction was determined. Table II shows the results of the test.

TABLE II

| Wire Construction | Topcoat % of Build | Average Time to Failure, Hours |
|---|---|---|
| Standard Essex MW35-C | 20 | 0.8 |
| 15 wt. % Silica in the AI topcoat | 40 | 17.6 |
| 15 wt. % $Cr_2O_3$ in the AI topcoat | 40 | 4.9 |
| 7.5 wt. % Silica + 7.5 wt. % $Cr_2O_3$ in AI topcoat | 40 | 245.0 |
| 7.5 wt. % Silica + 7.5 wt. % $Cr_2O_3$ in AI topcoat | 20 | 172.0 |

Table III and Table IV show inverter duty motor test results for other embodiments. Table III shows the affect of adding a relatively thin (0.3 mil) unfilled outer layer of polyamide-imide to a magnet wire having a silica/$Cr_2O_3$-filled polyamide-imide intermediate layer and an unfilled polyester base coat. The unfilled outer layer helps decrease tooling wear associated with the abrasive silica and chromium oxide particles. The magnet wires were made in a manner similar to the examples shown in Table II. Typical dielectric twisted pairs (five each) were made from the magnet wires and were tested at 150° C. in a 575-volt ac inverter drive/three-phase motor set-up as described in the previous examples. The twisted pairs were monitored until they shorted out, signifying a failure. The times were recorded from the beginning of the test to each short, and the hours to failure were recorded. An average for each wire construction was determined.

TABLE III

| Wire Construction | Filled AI, % of Build | Average Time to Failure, Hours |
|---|---|---|
| Standard Essex MW35-C: | — | 1 |
| Unfilled Polyester Base Coat Unfilled AI Topcoat Two-Coat Construction: | 26 | 167 |
| Unfilled Polyester Base Coat 7.5 wt. % Silica + 7.5 wt. % $Cr_2O_3$ in AI Topcoat Three-Coat Construction: | 23 | 172 |
| Unfilled Polyester Base Coat 7.5 wt. % Silica + 7.5 wt. % $Cr_2O_3$ in AI Intermediate Layer Unfilled AI Outer Layer | | |

Table IV shows inverter duty motor test results for magnet wires containing a single layer of polyamide-imide (no polyester base coat). The AI layer of each set of wires contained a one-to-one weight ratio of silica and chromium oxide (total oxide level 15% based on AI weight). References in Table IV to "single," "heavy," "triple," and "quad" correspond to the nominal insulation thickness of 1.7, 3.0, 4.3 and 6.4 mils, respectively. The magnet wires were made in a manner similar to the examples shown in Tables I–III. Typical twisted pairs (five each) were made from the magnet wires and were tested at either 150° C. (single, heavy build) or 200° C. (triple, quad build) in the 575-volt ac inverter drive/three-phase motor set-up as described in the previous example. The twisted pairs were monitored until they shorted out, signifying a failure. The times were recorded from the beginning of the test to each short, and the hours to failure were recorded. An average for each wire construction was determined. The triple and quad-build magnet wires were tested at a higher temperature to shorten the test time. But even at 200° C., two of the five quad-build magnet wire pairs did not fail before the tests were terminated after 2640 hours.

TABLE IV

| Insulation Thickness (Build) | Time to Failure, Hours |
|---|---|
| Single | 15 |
| Heavy | 701 |
| Triple | 1155 |
| Quad | 2270+ |

It is to be understood that the above description is intended to be illustrative and not restrictive. Many embodiments will be apparent to those of skill in the art upon reading the above description. The scope of the invention should, therefore, be determined not with reference to the above description, but should instead be determined with reference to the appended claims, along with the full scope of equivalents to which such claims are entitled. The disclosures of any articles and references, including patent applications and publications, are incorporated herein by reference for all purposes.

What is claimed is:

1. An insulation for an electrical conductor comprising:
   first and second layers of a polymer disposed around the electrical conductor, the second layer disposed on the first layer;
   a mixture of silica and chromium oxide dispersed in at least one of the first and second polymer layers, the mixture of silica and chromium oxide providing resistance to degradation of the insulation as a result of high voltage and high frequency wave forms passing through the electrical conductor.

2. The insulation of claim 1 wherein the mixture of silica and chromium oxide is dispersed in the first layer.

3. The insulation of claim 1 wherein the silica has a particle size in a range from about 250 $m^2$/g to about 550 $m^2$/g.

4. The insulation of claim 1 wherein the silica has a particle size in a range from about 380 $m^2$/g to about 550 $m^2$.

5. An insulation for an electrical conductor comprising:
   a polyester layer surrounding the electrical conductor; and
   first and second polyamide-imide layers surrounding the polyester layer, the second polyamide-imide layer disposed on the first polyamide-imide layer;
   wherein at least one of the layers includes a mixture of silica and chromium oxide dispersed therein, the mixture of silica and chromium oxide providing resistance to degradation of the insulation as a result of high voltage and high frequency wave forms passing through the electrical conductor.

6. The insulation of claim 5 wherein the mixture of silica and chromium oxide is dispersed in the first polyamide-imide layer.

7. The insulation of claim 5 wherein the silica has a particle size in a range from about 250 $m^2$/g to about 550 $m^2$/g.

8. The insulation of claim 5 wherein the silica has a particle size in a range from about 380 $m^2$/g to about 550 $m^2$/g.

9. An insulation for an electrical conductor comprising:
   at least one layer of a polymer disposed around the electrical conductor;
   a mixture of silica and chromium oxide dispersed in the polymer layer, the mixture of silica and chromium oxide providing resistance to degradation of the insulation as a result of high voltage and high frequency wave forms passing through the electrical conductor.

10. The insulation of claim 9 wherein the silica has a particle size in a range from about 250 $m^2$/g to about 550 $m^2$/g.

11. The insulation of claim 9 wherein the silica has a particle size in a range from about 380 $m^2$/g to about 550 $m^2$.

12. An insulation for an electrical conductor comprising:
    a polyester insulating layer surrounding the electrical conductor;
    a polyamide-imide insulating layer surrounding the polyester layer;
    wherein at least one of the insulating layers includes a mixture of silica and chromium oxide dispersed therein, the mixture of silica and chromium oxide providing resistance to degradation of the insulation as a result of high voltage and high frequency wave forms passing through the electrical conductor.

13. The insulation of claim 12 wherein the silica has a particle size in a range from about 250 $m^2$/g to about 550 $m^2$/g.

14. The insulation of claim 12 wherein the silica has a particle size in a range from about 380 $m^2$/g to about 550 $m^2$.

* * * * *